US 8,753,550 B2

(12) United States Patent
Vairon et al.

(10) Patent No.: US 8,753,550 B2
(45) Date of Patent: Jun. 17, 2014

(54) SURFACE-MODIFIED PIGMENT COMPOSITIONS

(75) Inventors: Céline Vairon, Steckborn (CH); Marc Maurer, Village-Neuf (FR); Ulrich Veith, Dornach (CH); Sascha Gysin, Basel (CH)

(73) Assignee: BASF SE, Ludwigshafen (DE)

( * ) Notice: Subject to any disclaimer, the term of this patent is extended or adjusted under 35 U.S.C. 154(b) by 153 days.

(21) Appl. No.: 13/378,384

(22) PCT Filed: Jun. 15, 2010

(86) PCT No.: PCT/EP2010/058345
§ 371 (c)(1),
(2), (4) Date: Jan. 27, 2012

(87) PCT Pub. No.: WO2010/146034
PCT Pub. Date: Dec. 23, 2010

(65) Prior Publication Data
US 2012/0126184 A1 May 24, 2012

(30) Foreign Application Priority Data

Jun. 16, 2009 (EP) .................. 09162761

(51) Int. Cl.
| F21V 9/00 | (2006.01) |
| G02B 5/02 | (2006.01) |
| G02C 7/10 | (2006.01) |
| G02F 1/361 | (2006.01) |
| G03B 11/00 | (2006.01) |
| C09B 67/00 | (2006.01) |
| C09B 48/00 | (2006.01) |
| C09B 67/52 | (2006.01) |

(52) U.S. Cl.
USPC ...... 252/582; 106/287.21; 106/476; 106/495; 544/105; 544/354

(58) Field of Classification Search
USPC .................. 106/287.21, 476, 495; 252/582; 544/105, 354
See application file for complete search history.

(56) References Cited

U.S. PATENT DOCUMENTS

| 4,844,742 A | 7/1989 | Jaffe |
| 5,554,739 A | 9/1996 | Belmont |
| 5,851,280 A | 12/1998 | Belmont et al. |
| 5,904,762 A | 5/1999 | Mahmud et al. |
| 6,057,387 A | 5/2000 | Mahmud et al. |
| 6,494,943 B1 | 12/2002 | Yu et al. |
| 6,503,970 B1 | 1/2003 | Valin |
| 2003/0095914 A1 | 5/2003 | Belmont et al. |
| 2005/0031528 A1 | 2/2005 | Niedermeier et al. |
| 2005/0034629 A1 | 2/2005 | Belmont et al. |
| 2008/0124481 A1 | 5/2008 | Nakajima et al. |

FOREIGN PATENT DOCUMENTS

| EP | 1 505 126 | 2/2005 |
| EP | 1 942 156 | 7/2008 |
| WO | 96 18688 | 6/1996 |
| WO | 96 18690 | 6/1996 |
| WO | 98 47971 | 10/1998 |
| WO | 02 055610 | 7/2002 |

OTHER PUBLICATIONS

International Search Report Issued Dec. 22, 2010 in PCT/EP10/58345 Filed Jun. 15, 2010.
European Search Report Issued Jan. 5, 2010 in EP 09 16 2761 Filed Jun. 16, 2009.

*Primary Examiner* — Bijan Ahvazi
(74) *Attorney, Agent, or Firm* — Oblon, Spivak, McClelland, Maier & Neustadt, L.L.P.

(57) ABSTRACT

Pigment compositions containing organic pigments with an outstanding migration-free property and an excellent rheology at high concentration, and derivatives thereof containing heterocyclic substituents. The pigment compositions contains (a) carbon black or an organic pigment containing a chromophore $Q_1$ of the following formula, wherein $Z_1$ and $Z_2$ are O or N—, C· is a carbon atom with an electron in a p orbital, and n is an integer from 1 to 4; and (b) a compound containing a chromophore of the following formula (II), wherein $Q_2$ is an m-valent residue of carbon black or of the chromophore $Q_1$; $G_1$ is preferably and $R_1, R_2, R_3, R_4, R_5, R_6$, and $R_8$ are preferably all H; m is an integer from 1 to 4. The pigment compositions can be used as rheology modifiers, preferably for pigmented coating compositions.

18 Claims, No Drawings

SURFACE-MODIFIED PIGMENT COMPOSITIONS

The invention pertains to pigment compositions comprising particular organic pigments usually prone to unsatisfactory dispersibility and/or rheology at high concentration, and derivatives thereof comprising special heterocyclic substituents.

U.S. Pat. No. 6,398,858 discloses a process for preparing colored pigments, using diazotable compounds, and leading to pigments substituted by groups comprising at least one aromatic and/or $C_1$-$C_{20}$alkyl group and at least one ionic, ionizable and/or nonionic group. The non-ionic groups may include, but are not limited to, hydrophilic groups, hydrophobic groups, alkyl and aryl groups, ethers, polyethers, alkyls, fluorinated alkyls and the like. The examples use only sulfanilic acid or p-amino-benzoic acid.

U.S. Pat. No. 6,494,943 and U.S. Pat. No. 6,506,245 disclose ink jet inks and other compositions containing coloured pigments, wherein the pigments are surface-modified by hydrodynamic cavitation in the presence of a diazotating agent. Surface modification is obtained by linking aromatic groups including aryl and heteroaryl groups, for example imidazolyl and indolyl. Specific reagents examplified for surface modifications are sulfanilic acid, p-amino-benzoic acid, N-p-amino-phenyl pyridinium chloride, 3,5-bis(trifluoromethyl)aniline and C. I. Direct Blue 71.

WO02/04 564 discloses inorganic and organic pigments substituted by at least one organic group of the formula —X-Sp-Alk, wherein X is an arylene or hetero-arylene, Sp is a spacer (for example succinimidylene) and Alk is a long-chain alkyl or alkenyl. There are only examples of substituted carbon black.

U.S. Pat. No. 6,896,726 discloses surface-treated organic pigments partially substituted by phenyl or naphthyl groups further substituted with linear dispersant groups, for example C. I. Pigment Red 255 substituted with diazotated procaine or C. I. Pigment Blue 15:3 substituted with diazotated 4-hexadecyl-sulfonylaniline.

WO2005/014 727 discloses black pigment compositions comprising carbon black and organic pigment derivatives wherein, amongst many others, barbituric acid, phthalimido or benzimidazolone substituents are linked to the chromophore in undisclosed manner, either directly or over alkylene chains.

Carbon black pigments and organic pigments comprising conjugated keto or azomethine groups generally lead to poorly satisfactory dispersibility and/or rheology at high level (in particular in so-called "high solids" coatings). This is especially true for organic pigments which are based on point-symmetrical and/or mirror-symmetrical chromophores. For the purpose of the invention, the symmetry of the chromophores should be considered under exclusion of any monovalent peripheral substituents having no or only little influence on the colour, such as halogen, alkyl and/or alkoxy.

Typical examples of such technically demanding organic pigments are anthan-throne, 1,1'-dianthraquinolyl, bis-(anthraquinone-1-yl-amino), bis-(anthraquinone-1-yl-oxy), BONA disazo condensation, BONA monoazo (including some benz-imidazolone pigments), diketopyrrolopyrrole, dioxazine, flavanthrone, indanthrone, isoindoline, isoindolinone, isoviolanthrone, naphthalocyanine, perylene, phthalocyanine, pyranthrone and quinacridone pigments. Many such pigments have point-symmetrical chromophores and the [na] phthalocyanines have mirror-symmetrical chromophores, but a few special non-symmetrical pigments from further pigment classes also take advantage of the invention.

Instantly suitable are carbon black as well as organic chromophores comprising at least one group of the formula

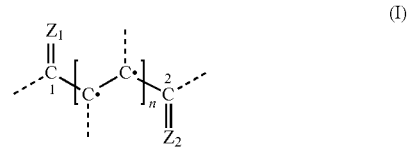

or a cis/trans isomer thereof, wherein $Z_1$ and $Z_2$ are each independently of the other O or N—, each C· is independently of all others C· a carbon atom with an electron in a p orbital, and n is an integer from 1 to 4, preferably 1 or 2, most preferably 1. The numbers on both oxo/imide-substituted C atoms ($\overset{}{\underset{1}{C}}, \overset{2}{C}$) have the only meaning to differentiate them.

All C·, C·, $\overset{}{\underset{1}{C}}$, $\overset{2}{C}$, $Z_1$, $Z_1$ and $Z_2$ are preferably essentially in the same plane (that is, a plane can be drawn which cuts all imaginary covalent spheres around these atoms' kernels, the diameter of which is $1.5 \cdot 10^{-10}$ m {=1.5 Å}, preferably $1 \cdot 10^{-10}$ m {=1 Å}), and they are most preferably part of an extended aromatic or heteroaromatic system. A carbon atom with an electron in a p orbital (C·) is meant to be bonded to 3 atoms (2 simple and 1 double bonds), with its covalent sphere (as defined above) cutting an imaginary plane extending through the kernels of the 3 atoms to which it is bonded. Cis/trans isomers of formula (I) should be understood as formulae resulting from 180° rotations around one or more of the bonds between

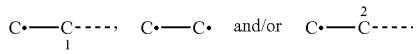

Thus, for example, each

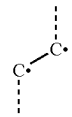

may be

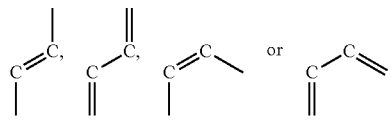

(when n≥2, for each C·—C· independently of the others). Organic chromophores are preferred, though carbon black is suitable, too.

In formula (I), the dashed lines indicate bonds to other atoms of the chromophore, thereby preferably forming aromatic or unsaturated cycles. There may optionally be additional, similar or different links between $\overset{}{\underset{1}{C}}$ and $\overset{2}{C}$ in the instant pigments' chromophores (this is in particular the case in polycyclic pigments), but this is not necessary as long as there is at least one preferably planar group of the formula (I) wherein n=1-4 for the shortest possible path. However, additional aromatic or unsaturated links do not require all atoms to be in the same plane and n may also be >4, depending on which path is chosen between $\overset{1}{C}$ and $\overset{2}{C}$.

In addition to the group of formula (I), the chromophores of the instant pigments preferably also comprise one or more NH, N-M-N or NH$_2$ groups, wherein M is a divalent metal, oxo-metal or halogeno-metal, such as Cu, Ni, Zn, Al—Cl, Ti=O or V=O. Preferred chromophores comprising NH, N-M-N or NH$_2$ groups are such of bis-(anthraquinone-1-yl-amino), bis-(anthraquinone-1-yl-oxy), 1,1'-dianthraquinolyl, diketopyrrolopyrrole, indanthrone, isoindoline, isoindolinone, perylene, 1-phenyl-hydrazono-2-oxy-3-carbamoyl-1,2-dihydronaphthalene, phthalocyanine and quinacridone pigments. Most preferred are chromophores of 1,1'-dianthraquinolyl, diketopyrrolopyrrole, indanthrone, isoindoline, isoindolinone, perylene, phthalo-cyanine and quinacridone pigments.

Suitable pigments include, for example, Pigment Yellow 24, 99, 108, 109, 110, 123, 138, 139, 147, 173, 175, 177, 179, 182, 185, 193, 199 and 257; Pigment Orange 22, 24, 31, 32, 38, 40, 43, 48, 49, 51, 61, 66, 69, 71, 73 and 81; Pigment Red 2, 5, 7, 8, 9, 10, 11, 12, 13, 14, 15, 16, 17, 18, 21, 22, 23, 31, 32, 83:1, 88, 90, 95, 112, 114, 119, 122, 123, 136, 144, 146, 147, 148, 149, 150, 164, 166, 168, 170, 174, 175, 176, 177, 178, 179, 180, 181, 184, 185, 187, 188, 190, 192, 194, 202, 204, 206, 207, 208, 209, 210, 212, 213, 214, 216, 220, 221, 222, 223, 224, 226, 238, 242, 245, 248, 253, 254, 255, 256, 258, 260, 261, 262, 264, 270 and 272; Pigment Brown 1, 23, 25, 38, 41 and 42; Pigment Violet 5:1, 13, 19, 23, 25, 29, 31, 32, 37, 42, 44 and 50; Pigment Blue 15, 15:1, 15:2, 15:3, 15:4, 15:6, 16, 25, 26, 60, 63, 64 and 66; Pigment Green 7, 8, 12, 36, 37, 47, 54 and 58; Pigment Black 6, 7, 20, 21, 31 and 32; Vat Red 41 and 74; 3,6-di(3',4'-dichloro-phenyl)-2,5-dihydro-pyrrolo-[3,4-c]pyrrole-1,4-dione, 3,6-di(4'-cyano-phenyl)-2,5-dihydro-pyrrolo[3,4-c]pyrrole-1,4-dione, Bisbenzimidazo[2,1-a:2',1'-a']anthra[2,1,9-def:6,5,10-d'e'f']diisoquinoline-10,21-dione [CAS 55034-79-2], Anthra[2",1",9":4,5,6:6",5",10":4',5',6']diisoquino-[2,1-a:2',1'-a']diperimidine-12,25-dione [CAS 6859-32-1] and the compounds according to example 12b of WO00/24 736 or obtainable according to the process of patent application EP 09 150 817.6 (in particular those according to claim 10, 11 or 12 of EP 09 150 817.6, which are incorporated herein by reference); as well as mixtures, mixed crystals and solid solutions comprising any components of the same chemical formulae and/or optionally having the same crystal lattice.

In addition to above pigments, the inventive compositions comprise derivatives of said pigments, which derivatives have the same chromophores as the pigments. These derivatives can conveniently be prepared by partially reacting a pigment with adequate reagents, thus preferably forming pigments on which surface there is a continuous or discontinuous layer or spots of the derivative.

It has now surprisingly been found that outstanding migration-free pigment compositions exhibiting an excellent rheology especially in high solids coating systems are obtained by using as modifying reagents particular heterocyclic compounds which are neither disclosed nor suggested in the prior art.

Therefore, the invention relates to a pigment composition comprising (a) (a1) carbon black or (a2) an organic pigment comprising a chromophore Q$_1$ which comprises at least one group of the formula

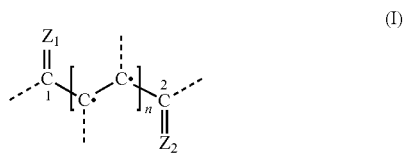

or a cis/trans isomer thereof, wherein Z$_1$ and Z$_2$ are each independently of the other O or N—, each C· is independently of all others C· a carbon atom with an electron in a p orbital, and n is an integer from 1 to 4; and (b) from 0.5 to 30 moles, preferably from 0.8 to 15 moles, most preferred from 1 to 10 moles, based on 3.5·10$^4$ g of carbon black or 100 moles of said organic pigment (a), of a compound comprising a chromophore of the formula

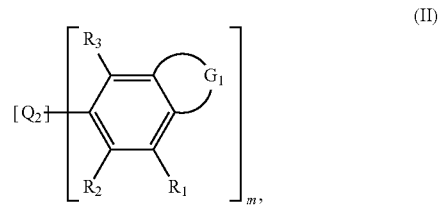

wherein Q$_2$ is a m-valent residue of carbon black or of the chromophore Q$_1$;

G1 is a divalent group consisting of a linear chain consisting of 3 or 4 links each selected independently from the others from the group consisting of

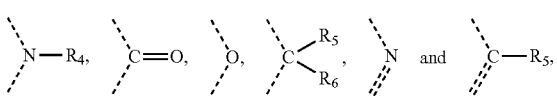

said links being sequentially connected together within the chain in any order by single bonds or, in case of two adjacent

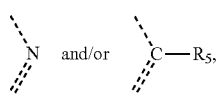

by double bonds, with the proviso that at least each one of the links are is

and at least one of remaining links is

R$_1$, R$_2$ and R$_3$ are each independently of the others H, halogen, OH, NH$_2$, NO$_2$, R$_7$, OR$_7$, SR$_7$, NR$_6$R$_7$, COR$_7$, CO$_2$R$_7$, CONR$_8$R$_7$ or SO$_2$R$_7$;

each $R_4$ is independently from any other $R_4$ H or $R_7$, preferably H, methyl or ethyl, most preferred H;

each $R_5$ is independently from any other $R_5$ H, halogen, OH, $NH_2$, $NO_2$, $R_7$, $OR_7$, $SR_7$, $NR_6R_7$, $COR_7$, $CO_2R_7$, $CONR_8R_7$ or $SO_2R_7$;

$R_6$ is H, a direct bond to a geminal $R_5$ or $R_7$, thus forming a 3- to 8-membered homo- or heterocyclic ring, or independently from any other $R_7$ a group $R_7$;

each $R_7$ is independently of any other $R_7$ $C_1$-$C_8$alkyl, $C_3$-$C_8$cycloalkyl, $C_2$-$C_8$alkenyl, $C_2$-$C_8$alkinyl or $C_3$-$C_8$cycloalkenyl which are each unsubstituted or substituted with one or more substituents selected from the group consisting of halogens, amino and hydroxy, and are uninterrupted or interrupted by one or more —O—, —S—, —NH— or —N($C_1$-$C_4$alkyl)-; and m is an integer from 1 to 4, preferably 1 or 2.

The compound (b) is in general a derivative of the pigment (a). For the purpose of calculating the adequate amount of component (b) and/or the integer m in formula (II), a purely hypothetical "molecular weight" of 350 g/mol has to be assumed for carbon black.

Residues $Q_2$ of the chromophore $Q_1$ are chromophores $Q_1$ from which m peripheral H atoms have been abstracted, thus enabling formation of bonds to m substituents (that is, $Q_1$ is identical with $[Q_2\text{---}\text{---}H]_m$). Peripheral H atoms are preferably situated on aromatic C atoms. The chromophore $Q_1$ and the residue $Q_2$ may optionally be substituted by one or more same or different, monovalent peripheral substituents having no major influence on the colour, such as halogen, alkyl and/or alkoxy. NH, N-M-N and $NH_2$ groups as well as other substituents having a major influence on the colour (that is, substituents shifting the main absorption peak in the range 400-700 nm by ≥50 nm, preferably ≥30 nm, as compared with hydrogen) should be considered to be part of the chromophore $Q_1$ and residue $Q_2$, respectively. When the chromophore $Q_1$ is substituted, its residue $Q_2$ is most adequately identically substituted unless the pigment is a solid solution, in which latter case the chromophore $Q_1$ and the residue $Q_2$ might originate from chemically different molecules of the solid solution (the more reactive ones leading to the substituted residue $Q_2$ and the less reactive ones leading to the remaining unsubstituted chromophore $Q_1$).

The dashed lines in $G_1$ indicate bonds between sequential links of the chain and/or from the extremities of the chain $G_1$ to the aromatic ring. The 3 or 4 links of the divalent group $G_1$ are preferably selected each independently from the others from the group consisting of

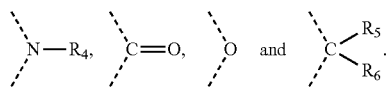

Surprisingly, the symmetrical divalent groups

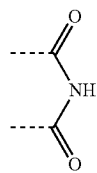

are generally less effective than other 3-membered chains $G_1$. In a preferred embodiment usually leading to an excellent performance, the chains $G_1$ are 4-membered, thus forming a 6-membered ring condensed with the aromatic ring.

Especially preferred chains $G_1$ are

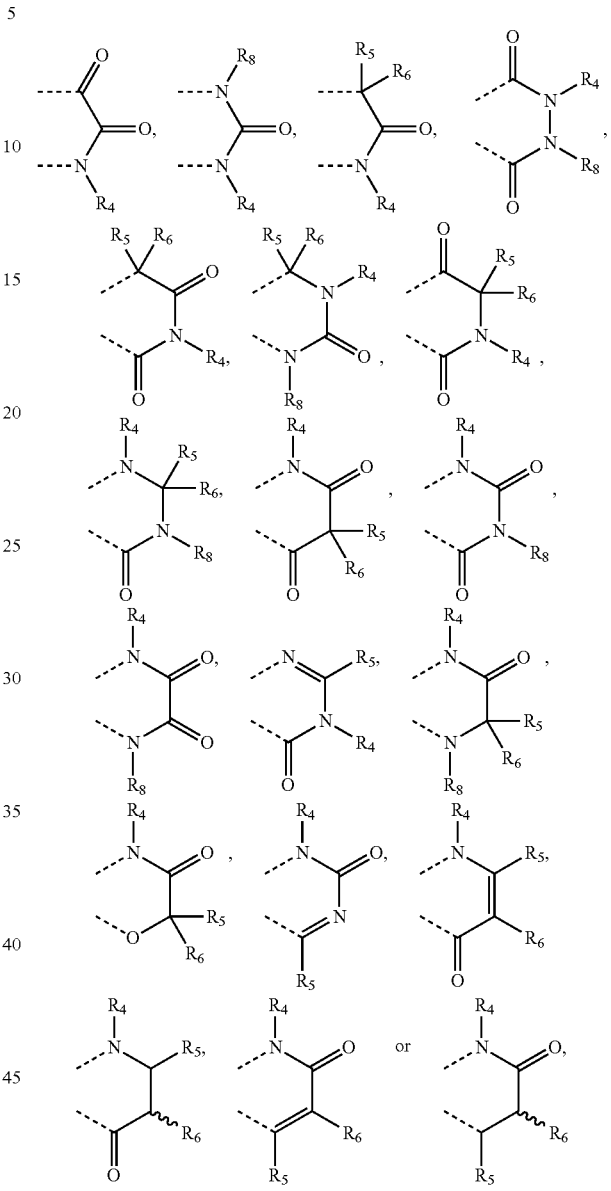

any extremity of $G_1$ being attached to the aromatic C atom in meta position to $Q_2$ and the other extremity of $G_1$ being attached to the aromatic C atom in para position to $Q_2$, and $R_8$ having independently from $R_4$ the same definition as $R_4$. In these especially preferred chains $G_1$ particularly preferred, $R_4$, $R_5$, $R_6$ and $R_8$ are each independently of the other H or methyl, most preferred $R_4$, $R_6$ and $R_8$ are H and $R_5$ is H or methyl.

Halogen is Cl, Br or F, preferably Cl on aryl or heteroaryl and F on alkyl. Alkenyl and cycloalkenyl may comprise one or more unsaturated bonds.

$C_1$-$C_8$alkyl is throughout preferred methyl, ethyl, n-propyl, isopropyl, n-butyl, isobutyl, sec-butyl, tert-butyl or tert-amyl. $C_3$-$C_8$cycloalkyl is throughout preferred cyclopentyl or cyclohexyl. $C_2$-$C_8$alkenyl is throughout preferred vinyl or allyl.

$R_1$, $R_2$, $R_3$, $R_4$, $R_5$, $R_6$, $R_7$ and $R_8$ are preferably ethyl, methyl or hydrogen, most preferably hydrogen.

Most preferred, $G_1$ is

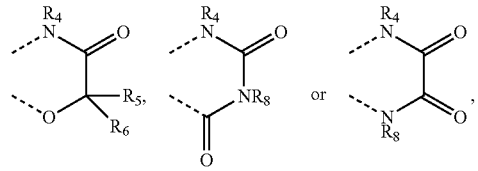

thus leading to the chromophore;

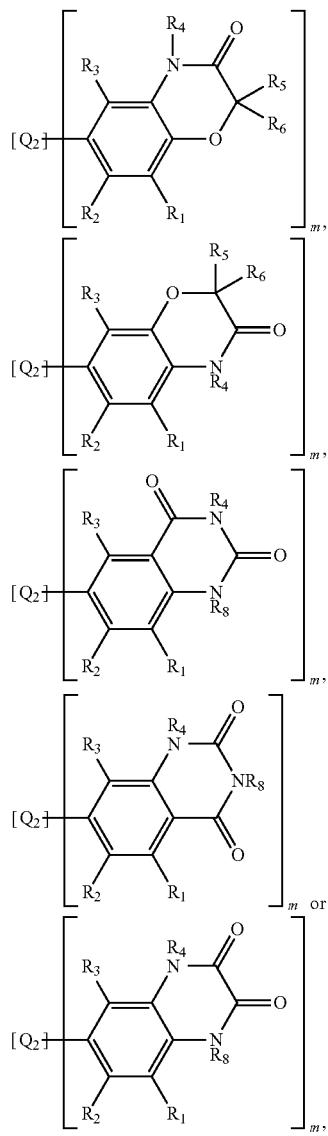

wherein $R_1$, $R_2$, $R_3$, $R_4$ and $R_8$ are preferably all H.

The thus obtained compounds are novel and also an object of the invention. If desired, they can be extracted from the reaction mixture with a highly polar solvent and reprecipitated, but it is in general more efficient to use them in the form of pigment compositions as obtained.

Hence, the invention also relates to a compound comprising a chromophore of formula

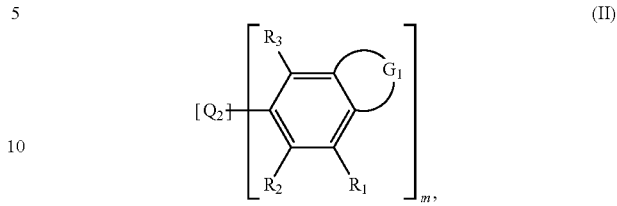

wherein m is an integer from 1 to 4, preferably 1 or 2;

$Q_2$ is a residue of carbon black or of a chromophore which comprises at least one group of the formula

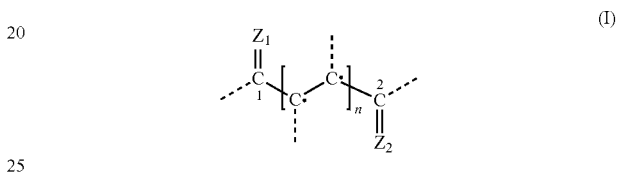

or a cis/trans isomer thereof, wherein $Z_1$ and $Z_2$ are each independently of the other O or N—, each C· is independently of all others C· a carbon atom with an electron in a p orbital, and n is an integer from 1 to 4;

G1 is a divalent group consisting of a linear chain consisting of 3 or 4 links each selected independently from the others from the group consisting of

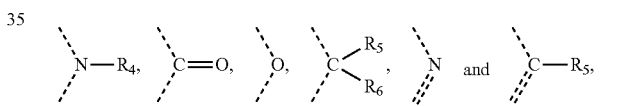

said links being sequentially connected together within the chain in any order by single bonds or, in case of two adjacent

by double bonds, with the proviso that at least one of the links is

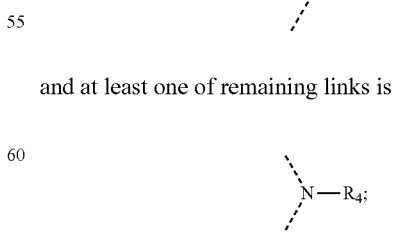

and at least one of remaining links is $R_1$, $R_2$ and $R_3$ are each independently of the others H, halogen, OH, $NH_2$, $NO_2$, $R_7$, $OR_7$, $SR_7$, $NR_6R_7$, $COR_7$, $CO_2R_7$, $CONR_6R_7$ or $SO_2R_7$;

each $R_4$ is independently from any other $R_4H$ or $R_7$, preferably H, methyl or ethyl, most preferred H;

each $R_5$ is independently from any other $R_5H$, halogen, OH, $NH_2$, $NO_2$, $R_7$, $OR_7$, $SR_7$, $NR_6R_7$, $COR_7$, $CO_2R_7$, $CONR_8R_7$ or $SO_2R_7$;

$R_6$ is H, a direct bond to a geminal $R_5$ or $R_7$, thus forming a 3- to 8-membered homo- or heterocyclic ring, or independently from any other $R_7$ a group $R_7$;

each $R_7$ is independently of any other $R_7C_1$-$C_8$alkyl, $C_3$-$C_8$cycloalkyl, $C_2$-$C_8$alkenyl, $C_2$-$C_8$alkinyl or $C_3$-$C_8$cycloalkenyl which are each unsubstituted or substituted with one or more substituents selected from the group consisting of halogens, amino and hydroxy, and are uninterrupted or interrupted by one or more —O—, —S—, —NH— or —N($C_1$-$C_4$alkyl)-; and m is an integer from 1 to 4, preferably 1 or 2.

The instant compounds can be used as rheology modifiers, preferably for pigmen-ted coating compositions. Most preferred are mid and especially high solids coating compositions, usually such with a pigment:binder ratio of from about 1:1 to about 10:1 after curing. The light, weathering and heat stabilities are excellent, as are the negligible bleeding and the coating properties, such as, in particular, good rheology, high gloss, high tinctorial strength and excellent overcoating resistance.

Hence, the invention also pertains to a coating composition, comprising from 0 to 50% by weight, preferably from 5 to 30% by weight of a volatile part, from 10 to 50% by weight of a non-volatile, essentially colourless part, and from 5 to 85% by weight of a colourant part comprising carbon black and/or an organic pigment comprising a chromophore $Q_1$ which comprises at least one group of the formula

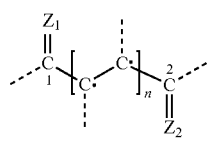

(I)

or a cis/trans isomer thereof, wherein $Z_1$ and $Z_2$ are each independently of the other O or N—, each C· is independently of all others C· a carbon atom with an electron in a p orbital, and n is an integer from 1 to 4, all above weight percentages based on the total weight of the curing composition which is always 100%, characterized in that said coating composition also comprises from 0.5 to 30 moles, preferably from 0.8 to 15 moles, most preferred from 1 to 10 moles, based on $3.5 \cdot 10^4$ g of carbon black or 100 moles of said organic pigment, of a compound comprising a chromophore of the formula

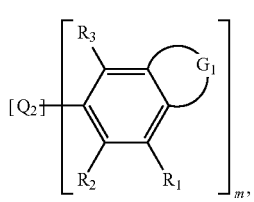

(II)

wherein $Q_2$ is a m-valent residue of carbon black or of the chromophore $Q_1$;

G1 is a divalent group consisting of a linear chain consisting of 3 or 4 links each selected independently from the others from the group consisting of

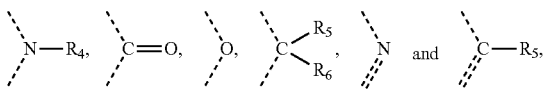

said links being sequentially connected together within the chain in any order by single bonds or, in case of two adjacent

by double bonds, with the proviso that at least one of the links is

and at least one of remaining links is

$R_1$, $R_2$ and $R_3$ are each independently of the others H, halogen, OH, $NH_2$, $NO_2$, $R_7$, $OR_7$, $SR_7$, $NR_6R_7$, $COR_7$, $CO_2R_7$, $CONR_8R_7$ or $SO_2R_7$;

each $R_4$ is independently from any other $R_4H$ or $R_7$, preferably H, methyl or ethyl, most preferred H;

each $R_5$ is independently from any other $R_5H$, halogen, OH, $NH_2$, $NO_2$, $R_7$, $OR_7$, $SR_7$, $NR_6R_7$, $COR_7$, $CO_2R_7$, $CONR_8R_7$ or $SO_2R_7$;

$R_6$ is H, a direct bond to a geminal $R_5$ or $R_7$, thus forming a 3- to 8-membered homo- or heterocyclic ring, or independently from any other $R_7$ a group $R_7$;

each $R_7$ is independently of any other $R_7C_1$-$C_8$alkyl, $C_3$-$C_8$cycloalkyl, $C_2$-$C_8$alkenyl, $C_2$-$C_8$alkinyl or $C_3$-$C_8$cycloalkenyl which are each unsubstituted or substituted with one or more substituents selected from the group consisting of halogens, amino and hydroxy, and are uninterrupted or interrupted by one or more —O—, —S—, —NH— or —N($C_1$-$C_4$alkyl)-; and m is an integer from 1 to 4, preferably 1 or 2.

The volatile part of the coating composition is the part which vanishes from the coating upon curing. The non-volatile part comprises binders and/or binder precursors and if desired additives, such as photo initiators, stabilizers (e.g. antioxydants, UV absorbers, photo stabilizers, rheology modifiers, glossing agents), inorganic white or effect pigments (e.g. titanium dioxide, mica or aluminum flakes) and/or fillers. Binder precursors are compounds which react upon curing to form a binder (in general unsaturated monomers and telomers). Essentially colourless should be understood as excluding compounds having a molar absorption coefficient $K_n \geq 5000$ $1 \cdot mol^{-1} \cdot cm^{-1}$ at any wavelength in the range from 400 to 700 nm, especially colourants, such as those listed in the Colour Index.

The colourant part may consist essentially of carbon black and/or one or more organic pigments comprising a chromophore $Q_1$, or it may also comprise further colourants, such as partially or fully soluble dyes or particularly preferred inorganic black or colour pigments and/or organic pigments having different chromophores. The purpose of optionally adding additional colourants is in general to adjust the hue, chroma and/or transparency or opacity, to generate a special effect (such as goniochromaticity and/or angular reflectivity), or to optimize the cost efficiency of the coating composition.

The instant compounds comprising chromophores of the formula (II) are adequately obtained in analogy to known methods, for example by treating a suspension of the pigment in a liquid medium with a diazonium salt of the formula

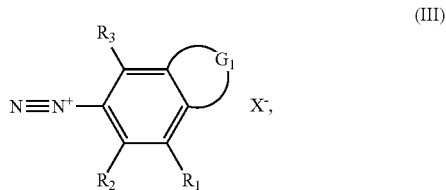

wherein $X^-$ is an inorganic anion, or with a compound of the formula

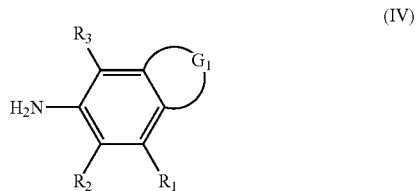

and a diazotating agent, for example similarly to the processes disclosed in many well-known patents of Cabot Corporation, such as U.S. Pat. No. 6,398,858, U.S. Pat. No. 6,494,943, U.S. Pat. No. 6,506,245 or WO 02/04 564. The instant compounds are most adequately prepared at a temperature of from −20 to 200° C., preferably from 0 to 100° C., for a time period of from 1 minute to 100 hours.

The diazonium salt of the formula (III) or compound of the formula (IV) is adequately used in stoichiometric amount or in slight or large excess, for example up to 5 times the stoichiometric amount, preferably about from 2 to 3 times the stoichiometric amount, based on the desired amount of compound of formula (II). The optimal amount depends somewhat on the pigment to be substituted and can in any case easily be determined experimentally.

Liquid media are usual liquids not reacting with the pigment nor dissolving it substantially, for example water or usual hydrophobic or preferably hydrophilic solvents. The liquid media might, however, react with the diazonium salt, for example leading to loss of $N_2$, so far they do not quench it with the formation of non-reactive compounds, thus inhibiting the desired reaction with the pigment. For the same reason, the reaction is adequately performed in the absence of coupling components.

Suitable liquid media include, for example, water, hydrocarbons, alcohols, amides, nitriles, nitro compounds, N-heterocycles, ethers, acids, esters, carbonates and sulfur compounds and may be singly or multiply unsaturated or halogenated. Examples are pentane, hexane, n-octane, dodecane or other linear or branched, saturated or unsaturated hydrocarbons, cyclohexane, methanol, ethanol, n-propanol, isopropanol, n-butanol, isobutanol, amyl alcohol, cyclohexanol or other isomers of linear, branched or cyclic $C_1$-$C_8$ alcohols, diethyl ether, 1,2-dimethoxy-ethane, 1,2-diethoxy-ethane, 2-methoxyethanol, 2-ethoxy ethanol, 2-n-butoxyethanol or other $C_1$-$C_4$alkoxy $C_1$-$C_4$alkyl alcohols, acetic acid, propionic acid, butyric acid, hexanoic acid, n-octanoic acid, 2-ethylhexanoic acid, nonanoic acid, decanoic acid, lauric acid, myristic acid, palmitic acid, stearic acid and oleic acid, methyl acetate, ethyl acetate, isopropyl acetate, isobutyl acetate, n-butyl acetate, tert-butyl acetate, amyl acetate and 2-ethoxyethyl acetate, or other $C_1$-$C_4$alcanoic $C_1$-$C_4$alkyl esters, diethyl carbonate or ethylene carbonate, dioxanes, tetrahydrofuran, aceto-nitrile, N,N-dimethylformamide, N,N-diethylformamide, acetamide, N,N-dimethyl-acetamide, N,N-diethylacetamide and 2-methyl-1-pyrrolidone, dimethyl sulfoxide, sulfolane, N-methylpyrrolidone, trichloroethane, nitrobenzene and halogenated benzenes. Further examples may be taken from standard works. The solvent may also be a mixture of 2 or more, for example from 3 to 20, liquids chosen from above list (including complex mixtures such as petroleum distillate fractions). In general, the use of water or aqueous mixtures is preferred for economical reasons.

The diazotating agent is for example an alkali nitrite, such as sodium nitrite, an organic nitrite, such as tert-butyl nitrite, or nitroso sulfuric acid. Inorganic anions may for example be halogenides, such as chloride, sulfate, hydrogen sulfate, phosphate, hydrogen phosphate, dihydrogen phosphate, chlorate, periodate, or complex anions such as tetrafluoroborate or hexafluorophosphate. Inorganic or organic acids and/or bases may additionally be used to control the pH of the reaction medium, which might be alkaline, neutral or preferably acidic, for example in the pH range from 0.5 to 6, especially from 1 to 2, optionally in the form of buffer mixtures. Adequate diazotating conditions are well-known in art.

The pigment compositions according to the invention can be broadly used in the mass colouration of polymers. The invention therefore also relates to the use of a pigment composition according to the invention for mass-colouring a high molecular weight material and to a mass-coloured high molecular weight material containing from 0.01 to 70% by weight of a pigment composition according to the invention, based on the total coloured high molecular weight material.

The high molecular weight organic material to be coloured in accordance with the invention can be of natural or synthetic origin and usually has a molecular weight in the range of from $10^3$ to $10^8$ g/mol. It may be, for example, a natural resin or a drying oil, rubber or casein, or a modified natural substance, such as chlorinated rubber, an oil-modified alkyd resin, viscose, or a cellulose ether or ester, such as cellulose acetate, cellulose propionate, cellulose acetobutyrate or nitrocellulose, but is especially a completely synthetic organic polymer (either thermosetting plastics or thermoplastics), as are obtained by polymerisation, polycondensation or poly-addition, for example polycarbonate, polyester, such as polyethylene terephthalate or polybutylene terephthalate, polyolefins, such as polyethylene (HDPE, HDPE-HMW, HDPE-UHMW, LDPE, LLDPE, VLDPE, ULDPE), polypropylene or poly-isobutylene, substituted polyolefins, such as polymerisation products of vinyl chloride, vinyl acetate, styrene, acrylonitrile or acrylic acid and/or methacrylic acid esters, or butadiene, polystyrene or polymethyl methacrylate, and also copolymer-isation products of the said monomers, especially acrylonitrile/butadiene/styrene (ABS), styrene/acrylonitrile (SAN) or EVA.

From the range of polyaddition resins and polycondensation resins there may be mentioned condensation products of formaldehyde with phenols, so-called pheno-plasts, and condensation products of formaldehyde with urea, thiourea and melamine, so-called aminoplasts, the polyesters used as coating resins, either saturated, such as alkyd resins, or unsaturated, such as maleic resins, and also linear polyesters and polyamides or silicones.

Furthermore, the high molecular weight organic material can be a binder for coatings or printing inks, such as boiled linseed oil, nitrocellulose, alkyd resins, melamine resins, urea-formaldehyde resins, acrylic resins or other hardenable or polymerisable precursors. Multilayer systems are possible, too.

Specific examples of thermoplastic, thermoset, elastomeric, inherently crosslinked or crosslinked polymers into which the colourant compositions of the present invention may be incorporated into or coated onto are listed below.

1. Polymers of mono- and di-olefins, for example polypropylene, polyisobutylene, polybutene-1, poly-4-methylpentene-1, polyisoprene or polybutadiene and also polymerisates of cyclo-olefins, for example of cyclopentene or norbornene; and also polyethylene (which may optionally be crosslinked), for example high den-sity polyethylene (HDPE), high density polyethylene of high molecular weight (HDPE-HMW), high density polyethylene of ultra-high molecular weight (HDPE-UHMW), medium density polyethylene (MDPE), low density polyethylene (LDPE), and linear low density polyethylene (LLDPE), (VLDPE) and (ULDPE).

Polyolefins, that is to say polymers of mono-olefins, as mentioned by way of example in the preceding paragraph, especially polyethylene and polypropylene, can be prepared by various processes, especially by the following methods:
   a) by free radical polymerisation (usually at high pressure and high temperature);
   b) by means of a catalyst, the catalyst usually containing one or more metals of group IVb, Vb, VIb or VIII. Those metals generally have one or more ligands, such as oxides, halides, alcoholates, esters, ethers, amines, alkyls, alkenyls and/or aryls, which may be either $\pi$- or $\alpha$-coordinated. Such metal complexes may be free or fixed to carriers, for example to activated magnesium chloride, titanium(III) chloride, aluminium oxide or silicon oxide. Such catalysts may be soluble or insoluble in the polymerisation medium. The catalysts can be active as such in the polymerisation or further activators may be used, for example metal alkyls, metal hydrides, metal alkyl halides, metal alkyl oxides or metal alkyl oxanes, the metals being elements of group(s) Ia, IIa and/or IIIa. The activators may have been modified, for example, with further ester, ether, amine or silyl ether groups.

2. Mixtures of the polymers mentioned under 1.), for example mixtures of poly-propylene with polyisobutylene, polypropylene with polyethylene (for example PP/HDPE, PP/LDPE) and mixtures of different types of polyethylene (for example LDPE/HDPE).

3. Copolymers of mono- and di-olefins with one another or with other vinyl monomers, for example ethylene/propylene copolymers, linear low density polyethylene (LLDPE) and mixtures thereof with low density polyethylene (LDPE), propylene/butene-1 copolymers, propylene/isobutylene copolymers, ethylene/butene-1 copolymers, ethylene/hexene copolymers, ethylene/methyl-pentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and copolymers thereof with carbon monoxide, or ethylene/acrylic acid copolymers and salts thereof (ionomers), and also terpolymers of ethylene with propylene and a diene, such as hexadiene, dicyclopentadiene or ethylidenenorbornene; and also mixtures of such copolymers with one another or with polymers mentioned under 1.), for example polypropylene-ethylene/propylene copolymers, LDPE-ethylene/vinyl acetate copolymers, LDPE-ethylene/acrylic acid copolymers, LLDPE-ethylene/vinyl acetate copolymers, LLDPE-ethylene/acrylic acid copolymers and alternately or randomly structured polyalkylene-carbon monoxide copolymers and mixtures thereof with other polymers, for example polyamides.

4. Hydrocarbon resins (for example $C_5$-$C_9$) including hydrogenated modifications thereof (for example tackifier resins) and mixtures of polyalkylenes and starch.

5. Polystyrene, poly(p-methylstyrene), poly($\alpha$-methylstyrene).

6. Copolymers of styrene or $\alpha$-methylstyrene with dienes or acrylic derivatives, for example styrene/butadiene, styrene/acrylonitrile, styrene/alkyl methacrylate, styrene/butadiene/alkyl acrylate and methacrylate, styrene/maleic anhydride, styrene/acrylonitrile/methyl acrylate; high-impact-strength mixtures consisting of styrene copolymers and another polymer, for example a polyacrylate, a diene polymer or an ethylene/propylene/diene terpolymer; and also block copolymers of styrene, for example styrene/butadiene/styrene, styrene/isoprene/styrene, styrene/ethylene-butylene/styrene or styrene/ethylene-propylene/styrene.

7. Graft copolymers of styrene or $\alpha$-methylstyrene, for example styrene on poly-butadiene, styrene on polybutadiene/styrene or polybutadiene/acrylonitrile copolymers, styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleic acid imide on polybutadiene; styrene and maleic acid imide on poly-butadiene, styrene and alkyl acrylates or alkyl methacrylates on polybutadiene, styrene and acrylonitrile on ethylene/propylene/diene terpolymers, styrene and acrylonitrile on polyalkyl acrylates or polyalkyl methacrylates, styrene and acrylonitrile on acrylate/butadiene copolymers, and mixtures thereof with the copolymers mentioned under 6.), such as those known, for example, as so-called ABS, MBS, ASA or AES polymers.

8. Halogen-containing polymers, for example polychloroprene, chlorinated rubber, chlorinated and brominated copolymer of isobutylene/isoprene (halobutyl rubber), chlorinated or chlorosulfonated polyethylene, copolymers of ethylene and chlorinated ethylene, epichlorohydrin homo- and co-polymers, especially polymers of halogen-containing vinyl compounds, for example polyvinyl chloride, polyvinylidene chloride, polyvinyl fluoride, polyvinylidene fluoride; and copolymers thereof, such as vinyl chloride/vinylidene chloride, vinyl chloride/vinyl acetate or vinylidene chloride/vinyl acetate.

9. Polymers derived from $\alpha,\beta$-unsaturated acids and derivatives thereof, such as polyacrylates and polymethacrylates, or polymethyl methacrylates, polyacrylamides and polyacrylonitriles impact-resistant-modified with butyl acrylate.

10. Copolymers of the monomers mentioned under 9.) with one another or with other unsaturated monomers, for example acrylonitrile/butadiene copolymers, acrylonitrile/alkyl acrylate copolymers, acrylonitrile/alkoxyalkyl acrylate copolymers, acrylonitrile/vinyl halide copolymers or acrylonitrile/alkyl meth-acrylate/butadiene terpolymers.
11. Polymers derived from unsaturated alcohols and amines or their acyl derivatives or acetals, such as polyvinyl alcohol, polyvinyl acetate, stearate, benzoate or maleate, polyvinylbutyral, polyallyl phthalate, polyallylmelamine; and the co-polymers thereof with olefins mentioned in 1.).
12. Homo- and co-polymers of cyclic ethers, such as polyalkylene glycols, poly-ethylene oxide, polypropylene oxide or copolymers thereof with bisglycidyl ethers.
13. Polyacetals, such as polyoxymethylene, and also those polyoxymethylenes which contain comonomers, for example ethylene oxide; polyacetals modified with thermoplastic polyurethanes, acrylates or MBS.
14. Polyphenylene oxides and sulfides and mixtures thereof with styrene polymers or polyamides.
15. Polyurethanes derived from polyethers, polyesters and polybutadienes having terminal hydroxyl groups on the one hand and aliphatic or aromatic polyisocyanates on the other hand, and their initial products.
16. Polyamides and copolyamides derived from diamines and dicarboxylic acids and/or from aminocarboxylic acids or the corresponding lactams, such as polyamide 4, polyamide 6, polyamide 6/6, 6/10, 6/9, 6/12, 4/6, 12/12, polyamide 11, polyamide 12, aromatic polyamides derived from m-xylene, diamine and adipic acid; polyamides prepared from hexamethylenediamine and iso- and/or terephthalic acid and optionally an elastomer as modifier, for example poly-2,4,4-trimethylhexamethylene terephthalamide or poly-m-phenylene isophthalamide. Block copolymers of the above-mentioned polyamides with polyolefins, olefin copolymers, ionomers or chemically bonded or grafted elastomers; or with polyethers, for example with polyethylene glycol, polypropylene glycol or polytetramethylene glycol. Also polyamides or copoly-amides modified with EPDM or ABS; and polyamides condensed during processing ("RIM polyamide systems").
17. Polyureas, polyimides, polyamide imides, polyether imides, polyester imides, polyhydantoins and polybenzimidazoles.
18. Polyesters derived from dicarboxylic acids and dialcohols and/or from hydroxy-carboxylic acids or the corresponding lactones, such as polyethylene terephthalate, polybutylene terephthalate, poly-1,4-dimethylolcyclohexane terephthalate, polyhydroxybenzoates or polycaprolactone, and also block polyether esters derived from polyethers with hydroxyl terminal groups; and also polyesters modified with polycarbonates or MBS.
19. Polycarbonates and polyester carbonates.
20. Polysulfones, polyether sulfones and polyether ketones.
21. Crosslinked polymers derived from aldehydes on the one hand and phenols, urea or melamine on the other hand, such as phenol-formaldehyde, urea-formaldehyde and melamine-formaldehyde resins.
22. Drying and non-drying alkyd resins.
23. Unsaturated polyester resins derived from copolyesters of saturated and unsaturated dicarboxylic acids with polyhydric alcohols, and also vinyl compounds as crosslinking agents, and also the halogen-containing, difficultly combustible modifications thereof.
24. Crosslinkable acrylic resins derived from substituted acrylic esters, e.g. from epoxy acrylates, urethane acrylates or polyester acrylates.
25. Alkyd resins, polyester resins and acrylate resins that are crosslinked with melamine resins, urea resins, isocyanates, isocyanurates, polyisocyanates or epoxy resins.
26. Crosslinked epoxy resins derived from aliphatic, cycloaliphatic, heterocyclic or aromatic glycidyl compounds, e.g. products of bisphenol-A diglycidyl ethers, bisphenol-F diglycidyl ethers, that are crosslinked using customary hardeners, e.g. anhydrides or amines with or without accelerators.
27. Natural polymers, such as cellulose, natural rubber, gelatin, or polymer-homologously chemically modified derivatives thereof, such as cellulose acetates, propionates and butyrates, and the cellulose ethers, such as methyl cellulose; and also colophonium resins and derivatives.
28. Mixtures (polyblends) of the afore-mentioned polymers, for example PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

The thermoplastic, elastomeric, crosslinked or inherently crosslinked polymer is, for example, a polyolefin, polyamide, polyurethane, polyacrylate, polyacrylamide, polyvinyl alcohol, polycarbonate, polystyrene, polyester, polyacetal, a natural or synthetic rubber or a halogenated vinyl polymer such as PVC. The polymer may be a co-polymer, a polymer blend or part of a composite.

The said high molecular weight compounds can be used alone or in mixtures, in the form of plastic compositions, solutions or melts, which can optionally be spun to form fibres. It may be a ready-to-use composition or an article formed therefrom, or a masterbatch, for example in the form of granules. Optionally, for colouring high molecular weight organic materials in accordance with the invention it is also possible to use customary additives, which may be contained in the uncoloured organic material or can be added during incorporation.

Examples of such additives are stabilisers, such as antioxidants, UV stabilisers or light stabilisers, surfactants, wetting agents, plasticisers or texture improvers. When texture improvers are desired, they are optionally added preferably to the pigments according to the invention as early as during synthesis or during after-treatment.

Texture improvers are, for example, fatty acids having at least 12 carbon atoms, such as, especially, stearic or behenic acid, stearic or behenic acid amide, salts of stearic or behenic acid, such as magnesium, zinc or aluminium stearate or behenate, also quaternary ammonium compounds, such as, especially, tri($C_1$-$C_4$)-alkylbenzylammonium salts, such as trimethyl-, triethyl-, tri-n-propyl-, tri-isopropyl-, tri-n-butyl-, tri-sec-butyl- and tri-tert-butyl-benzylammonium salts, and also plastic-isers, such as epoxidised soybean oil, waxes, such as polyethylene wax, resin acids, such as abietic acid, colophonium soap, hydrogenated or dimerised colophonium, ($C_{12}$-$C_{18}$)paraffindisulfonic acid, alkylphenols and alcohols, such as stearyl alcohol, also lauryl amine or stearyl amine, and/or aliphatic 1,2-diols, such as 1,2-dodecanediol.

Preferred texture improvers are lauryl amine and stearyl amine, aliphatic 1,2-diols, stearic acid and its amides, salts and esters, epoxidised soybean oil, waxes and resin acids.

Such additives can be added, for example, advantageously in amounts of from 0.05 to 25% by weight, preferably from 0.5 to 15% by weight, based on the composition according to the invention, before, during or after the preparation thereof.

Coatings typically comprise a polymeric binder which can in principle be any binder customary in industry, for example those described in Ullmann's Encyclopedia of Industrial Chemistry, $5^{th}$ Edition, Vol. A18, pp. 368-426, VCH, Weinheim 1991. In general, it is a film-forming binder based on a thermoplastic or thermosetting resin, for example, a thermosetting resin. Examples thereof are alkyd, acrylic, acrylamide, polyester, styrenic, phenolic, melamine, epoxy and polyurethane resins.

The binder may also be a surface coating resin which dries in the air or hardens at room temperature. Exemplary of such binders are nitrocellulose, polyvinyl acetate, polyvinyl chloride, unsaturated polyester resins, polyacrylates, polyurethanes, epoxy resins, phenolic resins, and especially alkyd resins. The binder may further be a mixture of different surface coating resins. Provided the binders are curable binders, they are normally used together with a hardener and/or accelerator.

For example, non-limiting examples of common coating binders useful in the present invention include silicon containing polymers, fluorinated polymers, unsaturated polyesters, unsaturated polyamides, polyimides, crosslinkable acrylic resins derived from substituted acrylic esters, e.g. from epoxy acrylates, urethane acrylates, polyester acrylates, polymers of vinyl acetate, vinyl alcohol and vinyl amine. The coating binder polymers may be co-polymers, polymer blends or composites.

Coatings are frequently crosslinked with, for example, melamine resins, urea resins, isocyanates, isocyanurates, polyisocyanates, epoxy resins, anhydrides, poly acids and amines, with or without accelerators.

The binder can be a cold-curable or hot-curable binder; the addition of a curing catalyst may be advantageous. Suitable catalysts which accelerate curing of the binder are described, for example, in Ullmann's Encyclopedia of Industrial Chemistry, 5$^{th}$ Edition, Vol. A18, p. 469, VCH Verlagsgesellschaft, Weinheim 1991.

Examples of coating compositions containing specific binders are:
1. coatings based on cold- or hot-crosslinkable alkyd, acrylate, polyester, epoxy or melamine resins or mixtures of such resins, if desired with addition of a curing catalyst;
2. two-component polyurethane coatings based on hydroxyl-containing acrylate, polyester or polyether resins and aliphatic or aromatic isocyanates, isocyanurates or polyisocyanates;
3. one-component polyurethane coatings based on blocked isocyanates, isocyanurates or polyisocyanates which are deblocked during baking, if desired with addition of a melamine resin;
4. one-component polyurethane coatings based on a Tris-alkoxycarbonyltriazine crosslinker and a hydroxyl group containing resin such as acrylate, polyester or polyether resins;
5. one-component polyurethane coatings based on aliphatic or aromatic urethaneacrylates or polyurethaneacrylates having free amino groups within the urethane structure and melamine resins or polyether resins, if necessary with curing catalyst;
6. two-component coatings based on (poly)ketimines and aliphatic or aromatic isocyanates, isocyanurates or polyisocyanates;
7. two-component coatings based on (poly)ketimines and an unsaturated acrylate resin or a polyacetoacetate resin or a methacrylamidoglycolate methyl ester;
8. two-component coatings based on carboxyl- or amino-containing polyacrylates and polyepoxides;
9. two-component coatings based on acrylate resins containing anhydride groups and on a polyhydroxy or polyamino component;
10. two-component coatings based on acrylate-containing anhydrides and polyepoxides;
11. two-component coatings based on (poly)oxazolines and acrylate resins containing anhydride groups, or unsaturated acrylate resins, or aliphatic or aromatic isocyanates, isocyanurates or polyisocyanates;
12. two-component coatings based on unsaturated polyacrylates and polymalonates;
13. thermoplastic polyacrylate coatings based on thermoplastic acrylate resins or externally crosslinking acrylate resins in combination with etherified melamine resins; and
14. paint systems based on siloxane-modified or fluorine-modified acrylate resins.

For example, coatings or films comprising acrylate polymers are useful in the instant invention. Acrylic, methacrylic and acrylamide polymers and co-polymers dispersible in water may also readily be used as a binder in the present invention.

The coating composition can also comprise further components, examples being solvents, pigments, dyes, plasticizers, stabilizers, thixotropic agents, drying catalysts and/or levelling agents. Examples of possible components are those described in Ullmann's Encyclopedia of Industrial Chemistry, 5$^{th}$ Edition, Vol. A18, pp. 429-471, VCH, Weinheim 1991.

Possible drying catalysts or curing catalysts are, for example, organometallic compounds, amines, amino-containing resins and/or phosphines. Examples of organometallic compounds are metal carboxylates, especially those of the metals Pb, Mn, Co, Zn, Zr or Cu, or metal chelates, especially those of the metals Al, Ti or Zr, or organometallic compounds such as organotin compounds, for example.

Examples of metal carboxylates are the stearates of Pb, Mn or Zn, the octoates of Co, Zn or Cu, the naphthenates of Mn and Co or the corresponding linoleates, resinates or tallates.

Examples of metal chelates are the aluminium, titanium or zirconium chelates of acetylacetone, ethyl acetylacetate, salicylaldehyde, salicylaldoxime, o-hydroxy-acetophenone or ethyl trifluoroacetylacetate, and the alkoxides of these metals.

Examples of organotin compounds are dibutyltin oxide, dibutyltin dilaurate or dibutyltin dioctoate.

Examples of amines are, in particular, tertiary amines, for example tributylamine, triethanolamine, N-methyldiethanolamine, N-dimethylethanolamine, N-ethyl-morpholine, N-methylmorpholine or diazabicyclooctane (triethylenediamine) and salts thereof. Further examples are quaternary ammonium salts, for example trimethylbenzylammonium chloride.

Amino-containing resins are simultaneously binder and curing catalyst. Examples thereof are amino-containing acrylate copolymers.

The curing catalyst used can also be a phosphine, for example triphenylphosphine.

The coating compositions can also be radiation-curable coating compositions. In this case, the binder essentially comprises monomeric or oligomeric compounds containing ethylenically unsaturated bonds, which after application are cured by actinic radiation, i.e. converted into a crosslinked, high molecular weight form.

Where the system is UV-curing, it generally contains a photoinitiator as well. Suitable photoinitiators are well-known to the person skilled in the art and are preferably selected from halomethyloxadiazols, halomethyl-s-triazines, 3-aryl-substituted coumarins, benzophenones, acetophenones, cyclopentadiene-benzene-iron complexes, oxime esters and oximes. Suitable photoinitiators are also described, for example, in GB-2,339,571, U.S. Pat. No. 6,485,885, GB-2,358,017, GB-2,357,293, WO-02/100 903, J. Photopolym. Sci. Technol. 15, 51-57 (2002), IP.com Journal IPCOM 000012462D, 3(6), 101-109 (2003), US-2004/0 102 548, US-2004/0 102 673, WO 07/062,963 and WO 07/071, 497. Specific, useful photoinitiators as well as their amount and adequate solvents are disclosed in WO08/101,841, the contents of which from page 26/line 27 to page 33/line 5 are incorporated herein by reference.

Adequate systems are described, for example, in Ullmann's Encyclopedia of Industrial Chemistry, 5$^{th}$ Edition, Vol. A18, pages 451-453.

The coating compositions can comprise an organic solvent or solvent mixture in which the binder is soluble. The coating composition can otherwise be an aqueous solution or dispersion. The vehicle can also be a mixture of organic solvent and water. The coating composition may be a high-solids paint or can be solvent-free (e.g. a powder coating material). Illustrative examples of solvent-free formulations are mixtures of acrylates or methacrylates, unsaturated polyester/styrene mixtures or mixtures of other ethylenically unsaturated monomers or oligomers. Powder coatings are, for example, those described in Ullmann's Encyclopedia of Industrial Chemistry, 5$^{th}$ Edition, Vol. A18, pages 438-444. Powder coating materials may be in the form of a powder-slurry, too (dispersion of the powder preferably in water).

When used in a coating, the instant pigment compositions are incorporated into the coating as dispersed particles via techniques common in the art. The dispersion might be combined with the incorporation into the coating composition by use of adequate solvents.

The coating composition according to the invention can be applied to any desired substrate, for example to metal, wood, plastic, composite, glass or ceramic material substrates by the customary methods, for example by dipping, knife application, film drawing, brushing, spraying, pouring, draw down, spin coating, dipping or electrophoresis, the coatings according to the invention being formed after drying and hardening, advantageously thermally or by irradiation; see also Ullmann's Encyclopedia of Industrial Chemistry, 5$^{th}$ Edition, Vol. A18, pp. 491-500.

Further methods of application that result in coatings are powder coating and coil coating methods, all the details of which are known per se to the person skilled in the art.

The pigmenting of the high molecular weight organic substances with the pigment compositions according to the invention is carried out, for example, by admixing the latter, optionally in the form of a masterbatch, with the substrates using roll mills or mixing or grinding apparatus. The coloured material is then generally brought into the desired final form by methods known per se, such as by calendering, compression moulding, extrusion, coating, spraying, casting, printing or injection moulding. It is often desirable, in order to produce non-rigid mouldings or to reduce their brittleness, to incorporate so-called plasticisers into the high molecular weight compounds prior to shaping. As plasticisers there may be used, for example, esters of phosphoric acid, of phthalic acid or of sebacic acid. In the process according to the invention, the plasticisers may be incorporated into the polymers before or after incorporation of the pigment composition. It is also possible, in order to achieve different colour shades, to add to the high molecular weight organic materials, in addition to the pigment compositions, also fillers or other colour-imparting constituents, such as white, coloured or black pigments as well as effect pigments, in the respective desired amount.

The admixing of the pigment composition can also be effected immediately prior to the actual processing step, for example by continuously feeding a pulverulent colorant according to the invention and, at the same time, a granulated high molecular weight organic material, and optionally also additional ingredients, such as, for example, additives, directly into the intake zone of an extruder, where mixing takes place immediately before processing. Generally, however, it is preferable to mix the colorant into the high molecular weight organic material beforehand, since more uniform results can be achieved.

For colouring coatings and printing inks, the high molecular weight organic materials and the colorant compositions according to the invention are finely dispersed or dissolved, optionally together with additives, such as stabilisers, dispersants, gloss improvers, fillers, other pigments, siccatives or plasticisers, generally in an organic and/or aqueous solvent or solvent mixture. It is possible to use a procedure in which the individual components are dispersed or dissolved separately or in which a plurality thereof are dispersed or dissolved together and only then all of the components combined.

When the high molecular weight material to be coloured is a coating, it may be a customary coating or a speciality coating, for example an automotive finish. The coating may be a constituent of a multi-layer finish. Effect finishes can be obtained by addition of metal flakes, uncoated or coated mica and/or interference pigments. The advantages of the pigment compositions according to the invention are particularly striking in coating applications.

Preferably the coating according to the invention is additionally provided, as protection, with a clear lacquer of customary thickness which comprises, for example, one or more UV absorbers or is tinted with transparent colour pigments or includes effect pigments. If the coating according to the invention is located on a metal substrate, that substrate is preferably primed, for example with a white, black or grey primer. A grey primer is usually preferred for practical reasons.

Printing inks of generally known compositions are applied by customary methods, for example by letterpress printing (flexographic printing), planographic printing (offset printing, lithographic printing), intaglio printing (rotogravure, steel engraving), screen printing or ink-jet printing (piezo or vapour bubble methods), for example to paper, card, metal, wood, leather, plastics or textiles, for publications, illustrations, packaging, banknotes, logistics documents or decoration. Further ink compositions can be used in ballpoint pens and felt-tip pens as well as in ink pads, ink ribbons and ink cartridges.

The person skilled in the art is expressly advised as a matter of routine to try out any plastics, coating or printing ink compositions known to him, for example those which are the subject of published patent applications or those which are commercially available, even when he does not have precise knowledge of their compositions.

In addition to the mass-colouring of high molecular weight organic materials in the form of plastics, coatings and printing inks, the colorant compositions according to the invention are also suitable, for example, for the production of solid toners, wax transfer ribbons or, also preferred, colour filters.

Colour filters customarily have red, blue and green pixels and also, in most cases, a black matrix on a transparent carrier material. Instant colorant compositions based on carbon black or black organic pigments will generally be used in colour filters to form the black matrix (such as those disclosed in EP 09 150 825.9, the full contents of which are incorporated herein by reference), while instant colorant compositions based on colour pigments, especially red, blue or green organic pigments, will generally be used in colour filters to form one or more of the transparent layers, leading advantageously to surprisingly high transparency, high contrast, high colour purity (chroma) and broader achievable colour gamut.

The invention accordingly relates to the use of the instant compositions or compounds for the preparation of a colour filter as well as to a colour filter comprising image points (pixels) of at least three colours and optionally a black matrix, wherein a fraction of the image points and/or the optional black matrix comprise a composition according to the invention.

Colour filters may usually comprise further, preferably colourless components which are customary in colour filter formulations, such as solvents or, especially, additives, for example stabilisers, antioxidants, UV absorbers, photostabilisers, wetting agents, surfactants, antifoams, plasticisers, texture-improvers, binders, dispersants and also, preferably, polymerisable monomers or oligomers, depolymerisable polymers and/or photoinitiators. Further components of that kind are added in a total amount of advantageously from 0 to 2000%, based on the instant pigment compositions.

Compositions modifiable by radiation are also known as resists (for example, as described in WO 2007/113 107). Radiation (for example, UV light) can, for example, be directed through a mask onto a coating of the composition, in the course of which the irradiated locations become either more insoluble or more soluble. Those parts of the layer which have remained soluble or become soluble are subsequently removed so that the desired image points remain behind. The latter are then usually thermally cured.

Any desired compositions modifiable by radiation can be used, for example—but not exclusively—those which are disclosed in WO 07/062,963 or WO 07/071,497. Preference is given to compositions modifiable by radiation which are subsequently hardened optionally at a temperature of from 40 to 320° C., especially from 180 to 300° C., very especially from 200 to 250° C.

The components of radiation-hardenable compositions and the methods for the production of colour filters are known to the skilled person. Preferred methods are described in WO 08/101,841; the content of that application which is relevant to this use is accordingly incorporated in its entirety at this point into the present application by way of reference, especially page 19/line 1 to page 33/line 5. All procedures and preferences apply especially in combination with one another.

The examples which follow illustrate the invention, without limiting it ("%" are by weight where not otherwise specified):

EXAMPLE 1

A solid solution pigment consisting of 65% by weight of unsubstituted γ-quinacridone (C. I. Pigment Violet 19) and 35% by weight of 2,9-dichloroquinacridone (C. I. Pigment Red 202) is prepared in conventional manner and isolated as a wet press cake. This wet press cake is dispersed in water to form a suspension comprising 10% by weight of pigment and 90% by weight of water and the suspension is cooled at 0-3° C.

1.55 g of 6-amino-1,4-dihydroquinoxaline-2,3-dione (97% pure) are stirred with 50 ml of deionized water and 4.2 ml of aqueous hydrochloric acid (32% by weight HCl). The mixture is cooled to 0-3° C. and treated with 2.12 ml of a 4 M solution of sodium nitrite to form the diazonium salt.

The mixture comprising the diazonium salt is then slowly added to 300 g of the 10% pigment suspension. The suspension (pH~1) is sequentially stirred at 0-3° C., 23° C. and 60° C. for each 1 hour, then at 75-80° C. for 4½ hours, then finally cooled down to 25° C. and filtered. The residue is dispersed in slightly basic water and the resulting suspension is filtered. The residue is washed with deionized water, dried at 60° C. and then pulverized.

EXAMPLE 2

It is proceeded as in example 1, with the difference that 6-amino-1,4-dihydroquinoxaline-2,3-dione is replaced by an equimolar amount of 5-amino-isatin (85% pure) and the suspension (pH~1) is sequentially stirred at 0-3° C., 23° C. and 60° C. for each 1 hour, then at 70° C. for 3 hours before final cooling and filtration.

EXAMPLE 3

It is proceeded as in example 1, with the difference that 6-amino-1,4-dihydro-quinoxaline-2,3-dione is replaced by an equimolar amount of 4 amino-phthalimide (89% pure) and the suspension (pH~1) is sequentially stirred at 0-3° C., 23° C. and 60° C. for each 1 hour, then filtrated.

EXAMPLE 4

It is proceeded as in example 1, with the difference that 6-amino-1,4-dihydroquinoxaline-2,3-dione is replaced by an equimolar amount of 5-amino-benzimidazolone (94% pure) and the suspension (pH~1) is sequentially stirred at 0-3° C., 23° C. and 60° C. for each 1 hour, then at 85° C. for 4 hours before final cooling and filtration.

COMPARATIVE EXAMPLE 1

It is proceeded as in example 1, with the difference that 6-amino-1,4-dihydroquinoxaline-2,3-dione is replaced by an equimolar amount of sulfanilic acid and the suspension (pH~1) is sequentially stirred at 0-3° C. and 23° C. for each 1 hour, then at 65° C. for 2 hours before final cooling and filtration.

COMPARATIVE EXAMPLE 2

It is proceeded as in example 1, with the difference that 6-amino-1,4-dihydroquinoxaline-2,3-dione is replaced by an equimolar amount of procainamide and the suspension (pH~1) is sequentially stirred at 0-3° C. and 23° C. for each 1 hour, then at 60° C. for 2¼ hours before final cooling and filtration.

EXAMPLES 5-10

The pigment compositions according to examples 1, 2, 3 and 4 as well as comparative examples 1 and 2 are each tested as follows in a coating com-position. 8.0 g of each pigment composition according to examples 1, 2, 3 and 4 as well as comparative examples 1 and 2 are introduced in a 250 ml-jar containing 100 g of glass beads of diameter 2 mm. The other components are then added as follows:
4.0 grams of Disperbyk® 161 (Byk Chemie)
11.4 grams of a solution of 20% CAB-531-1 (Eastman Chem.) in n-butyl acetate
11.4 g of Maprenal® MF 650 (Clariant)
15.2 g of Setal® 173-VS-60 (Nuplex Resins)

The millbase containing 16% by weight of pigment com-position is obtained by dispersing the pigment composition in the above mixture for six hours on a Skandex® shaker. The millbase is separated from the beads by centrifugation and stored for two hours in an incubator at 23° C. for rheology measurements' purpose. The viscosity of the pigment compositions of the millbases is measured at different shearing rates from 0.07 to 1000 s$^{-1}$ with a cone/plate-system Thermo Haake RV1™ (Plate P61, Rotor Cone C60/1: D=60 mm, 1°, Titan). The results (interpolated on the curve best fitting all single measures) are as follows:

| Example | Composition according to: | Viscosity [mPa·s] @ 10 s$^{-1}$ | 100 s$^{-1}$ |
|---|---|---|---|
| 5 | example 1 | 1900 | 980 |
| 6 | example 2 | 1270 | 807 |
| 7 | example 3 | 2450 | 1090 |
| 8 | example 4 | 987 | 724 |
| 9 | comparative example 1 | 4930 | 1530 |
| 10 | comparative example 2 | 2560 | 1130 |

The compositions according to the instant examples 1 and 2 also perform much better than the compositions of comparative examples 1 and 2 in high solid coating systems which are available commercially, including such tailor-made by leading coatings manufacturers for specific customers or still under advanced development, the exact composition of which is not known to applicants.

EXAMPLE 11

35 g Paliogen® Red L 4120, lot 03355500 is dispersed in water to form a suspension comprising 10% by weight of pigment and 90% by weight of water and the suspension is cooled at 0-3° C.

1.81 g of 6-amino-1,4-dihydroquinoxaline-2,3-dione (97% pure) are stirred with 20 ml of deionized water and 4.8 ml of aqueous hydrochloric acid (32% by weight HCl). The mixture is cooled to 0-3° C. and treated with 2.47 ml of a 4 M solution of sodium nitrite to form the diazonium salt. Excess sodium nitrite is removed with sulfamic acid.

The mixture comprising the diazonium salt is then slowly added to 350 g of the 10% pigment suspension. The suspension (pH~1) is sequentially stirred at 0-3° C. for 1 h, at 25° C. over night and 60° C. for 8 hours, then finally cooled down to 25° C. and filtered. The residue is dispersed in 600 ml deionized water, the pH is adjusted to 9 and the resulting suspension is filtered. The residue is washed with deionized water, dried at 60° C. and 130 mbar and then pulverized. The yield was 35.3 g.

EXAMPLE 12

35 g Paliogen® Red L 4120, lot 03355500 is dispersed in water to form a suspension comprising 10% by weight of pigment and 90% by weight of water and the suspension is cooled at 0-3° C.

2.72 g of 7-Amino-2H-1,4-benzoxazin-3(4H)-one (64.3% pure) are stirred with 20 ml of deionized water and 5.2 ml of aqueous hydrochloric acid (32% by weight HCl). The mixture is cooled to 0-3° C. and treated with 2.67 ml of a 4 M solution of sodium nitrite to form the diazonium salt. Excess sodium nitrite is removed with sulfamic acid.

The mixture comprising the diazonium salt is then slowly added to 350 g of the 10% pigment suspension. The suspension (pH~1) is sequentially stirred at 0-3° C. for 1 h, at 25° C. over night and 70° C. for 3 hours, then finally cooled down to 25° C. and filtered. The residue is dispersed in 600 ml deionized water, the pH adjusted to 9 and the resulting suspension is filtered. The residue is washed with deionized water, dried at 60° C. and 130 mbar and then pulverized. The yield was 33.6 g.

EXAMPLE 13

30 g Paliogen® Red L 3885, lot 090008P040 is dispersed in water to form a suspension comprising 10% by weight of pigment and 90% by weight of water and the suspension is cooled at 0-3° C.

2.47 g of 6-amino-1,4-dihydroquinoxaline-2,3-dione (97% pure) (60.7% pure) are stirred with 50 ml of deionized water and 6.55 ml of aqueous hydrochloric acid (32% by weight HCl). The mixture is cooled to 0-3° C. and treated with 3.37 ml of a 4 M solution of sodium nitrite to form the diazonium salt. Excess sodium nitrite is removed with sulfamic acid.

The mixture comprising the diazonium salt is then slowly added to 300 g of the 10% pigment suspension. The suspension (pH~1) is sequentially stirred at 0-3° C. for 1 h and 85° C. for 16 hours, then finally cooled down to 25° C. and filtered. The residue is dispersed in 600 ml deionized water, the pH is adjusted to 9 and the resulting suspension is filtered. The residue is washed with deionized water, dried at 60° C. and 130 mbar and then pulverized. The yield was 30.2 g.

EXAMPLE 14

50 g Heliogen® Blue L 6950, lot 070002P040 is dispersed in water to form a suspension comprising 15% by weight of pigment and 85% by weight of water and the suspension is cooled at 0-3° C.

0.99 g of 6-amino-1,4-dihydroquinoxaline-2,3-dione (92.3% pure) are added followed by 2.0 ml of aqueous hydrochloric acid (32% by weight HCl). The mixture is treated with 0.96 ml of a 4 M solution of sodium nitrite to form the diazonium salt. Excess sodium nitrite was reduced with sulfamic acid The mixture comprising the diazonium salt and the pigment (pH~1) is then sequentially stirred at 0-3° C. for 1 h, at 80° C. for 16 hours, then finally cooled down to 45° C. Standard work-up resulted in 51.7 g dried and pulverized material.

EXAMPLE 15

10 g of an orange DPP pigment prepared according to Example 1E in U.S. Pat. No. 7,081,540 B2 is dispersed in water to form a suspension comprising 10% by weight of pigment and 90% by weight of water and the suspension is cooled at 0-3° C.

0.52 g of 6-amino-1,4-dihydroquinoxaline-2,3-dione (97% pure) are stirred with 30 ml of deionized water and 1.41 ml of aqueous hydrochloric acid (32% by weight HCl). The mixture is cooled to 0-3° C. and treated with 0.71 ml of a 4 M solution of sodium nitrite to form the diazonium salt. Excess sodium nitrite is removed with sulfamic acid.

The mixture comprising the diazonium salt is then slowly added to 100 g of the 10% pigment suspension. The suspension (pH~1) is sequentially stirred at 0-3° C. for 1 h, at 20-25° C. for 1 h, at 47-50° C. for 1 h and at 60-64° C. for 1 hour. The suspension is stirred for 12 h at 25° C., then for 1 h at 70-74° C., then at 80-84° C. for 1 h and 14 h at 90° C., then finally cooled down to 25° C. and filtered. The residue is dispersed in slightly basic water, the pH is adjusted to 9 using sodium hydroxide solution and the resulting suspension is filtered.

The residue is washed with deionized water, dried at 60° C. and 130 mbar and then pulverized. The yield was 8.9 g.

EXAMPLE 16

A solid solution pigment consisting of 65% by weight of unsubstituted γ-quinacridone (C. I. Pigment Violet 19) and 35% by weight of 2,9-dichloroquinacri-done (C. I. Pigment Red 202) is prepared in conventional manner, isolated as a wet press cake, dried at 60° C. and 130 mbar and then pulverized.

In analogy to Example 2 in U.S. Pat. No. 5,334,727 35.7 g of this dried material is dissolved in sulphuric acid (100% by weight H2SO4). The violet solution is heated to 40° C. and 13.4 g 2-hydroxybenzimidazol (97% pure) is added followed by 3.0 g paraformaldehyde. The reaction mixture is stirred at 60° C. for 5 h. The reaction mixture is poured into 2 liters of an ice/water mixture and stirred for 1 h. The mixture is filtered and the presscake washed with deionized water. The yield was 170 g wet presscake.

85 g of the wet presscake is suspended in 400 g water. The solid content is 6.14%. The suspension is treated with 1.19 g 1,2-Dodecandiol and heated to 70° C. for 1 h. The suspension is cooled to 45° C., filtered, washed with deionized water, dried at 50° C. and 250 mbar and then pulverized. The yield is 30.5 g.

EXAMPLE 17

20 g of a solid solution pigment consisting of 65% by weight of unsubstituted γ-quinacridone (C. I. Pigment Violet 19) and 35% by weight of 2,9-dichloroquinacridone (C. I. Pigment Red 202) prepared in conventional manner, isolated as a wet press cake, dried and pulverized are blended with 5 g dry pigment, prepared according to example 16.25 g of blended material were obtained.

EXAMPLE 18

50 g of a solid solution pigment consisting of 65% by weight of unsubstituted y-quinacridone (C. I. Pigment Violet 19) and 35% by weight of 2,9-dichloroquinacridone (C. I. Pigment Red 202) prepared in conventional manner.

This wet press cake is dispersed in water to form a suspension comprising 11% by weight of pigment and 89% by weight of water and the suspension is cooled at 0-3° C.

0.78 g of 5-amino-benzimidazolone (94% pure) are added followed by 1.9 ml of aqueous hydrochloric acid (32% by weight HCl). The mixture is treated with 0.91 ml of a 4 M solution of sodium nitrite to form the diazonium salt. Excess sodium nitrite was reduced with sulfamic acid The mixture comprising the diazonium salt and the pigment (pH~1) is then sequentially stirred at 25° C. for 1 h, at 80° C. for 2 hours and at 85° C. for 2.5 hours, then finally cooled down to 45° C. Standard work-up resulted in 43.6 g dried and pulverized material.

EXAMPLES 19-22

The pigment compositions according to examples reference Paliogen® Red L 3885 (lot 090008P040), 13, 17, 18 are each tested as follows in a coating composition. 8.0 g of each pigment composition according to examples reference Paliogen® Red L 3885 (lot 090008P040), 13, 17, 18 are introduced in a 250 ml-jar containing 100 g of glass beads of diameter 2 mm. The other compo-nents are then added as follows:
4.0 grams of Disperbyk® 161 (Byk Chemie)

11.4 grams of a solution of 20% CAB-531-1 (Eastman Chem.) in n-butyl acetate 11.4 g of Maprenal® MF 650 (Clariant)

15.2 g of Setal® 173-VS-60 (Nuplex Resins)

The millbase containing 16% by weight of pigment composition is obtained by dispersing the pigment composition in the above mixture for six hours on a Skandex® shaker. The millbase is separated from the beads by centrifugation and stored for two hours in an incubator at 23° C. for rheology measurements' purpose. The viscosity of the pigment compositions of the millbases is measured at different shearing rates from 0.07 to 1000 s$^{-1}$ with a cone/plate-system Thermo Haake RV1™ (Plate P61, Rotor Cone C60/1: D=60 mm, 1°, Titan). The results (interpolated on the curve best fitting all single measures) are as follows:

| Example | Composition according to: | Viscosity [mPa · s] @ 10 s$^{-1}$ | 100 s$^{-1}$ |
|---|---|---|---|
| 19 | Paliogen ® Red L 3885, lot 090008P040 | 8230 | 2010 |
| 20 | example 13 | 2450 | 1030 |
| 21 | example 17 | 2930 | 1070 |
| 22 | example 18 | 2460 | 989 |

The invention claimed is:

1. A pigment composition, comprising:

(a) (a1) carbon black or (a2) an organic pigment comprising a chromophore $Q_1$ comprising a group of formula (I),

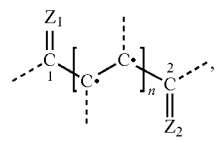

or a cis/trans isomer thereof, wherein $Z_1$ and $Z_2$ are each independently of the other, O or N—, each C· is independently of all other C·, a carbon atom with an electron in a p orbital, and n is an integer from 1 to 4; and (b) from 0.5 to 30 moles, based on 3.5·10$^4$ g of the carbon black (a1) or 100 moles of the organic pigment (a2), of a compound comprising a chromophore of formula (II),

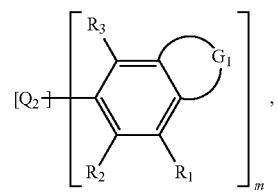

wherein, $Q_2$ is an m-valent residue of carbon black or of the chromophore $Q_1$;

$G_1$ is

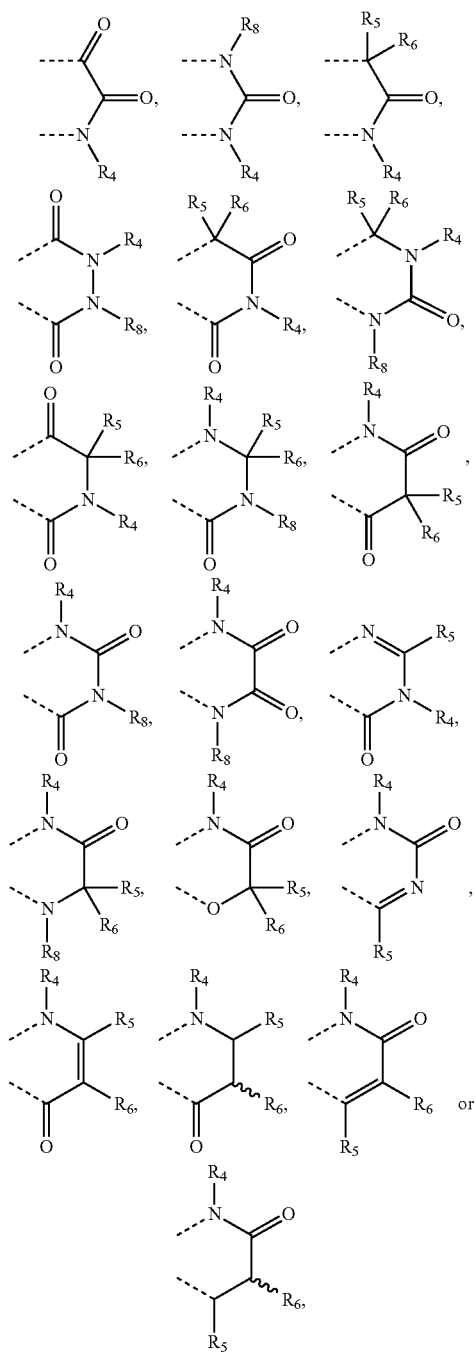

with one extremity of $G_1$ attached to an aromatic C atom in a meta position relative to $Q_2$ and another extremity of $G_1$ attached to the aromatic C atom in a para position relative to $Q_2$;

$R_8$ has, independently from $R_4$ the same definition as $R_4$;

$R_1$, $R_2$ and $R_3$ are each, independently of the others H, halogen, OH, $NH_2$, $NO_2$, $R_7$, $OR_7$, $SR_8$, $NR_6R_7$, $COR_7$, $CO_2R_7$, $CONR_6R_7$ or $SO_2R_7$;

each $R_4$ is, independently from any other $R_4$, H or $R_7$;

each $R_5$ is, independently from any other $R_5$, H, halogen, OH, $NH_2$, $NO_2$, $R_7$, $OR_7$, $SR_7$, $NR_6R_7$, $COR_7$, $CO_2R_7$, $CONR_6R_7$ or $SO_2R_7$;

$R_6$ is H, a direct bond to a geminal $R_5$ or $R_7$ thus forming a 3- to 8-membered homo- or heterocyclic ring, or $R_7$ which is independently from any other $R_7$;

each $R_7$ is, independently of any other $R_7$, $C_1$-$C_8$alkyl, $C_3$-$C_8$cycloalkyl, $C_2$-$C_8$alkenyl, $C_2$-$C_8$alkinyl or $C_3$-$C_8$cycloalkenyl which are each unsubstituted or substituted with at least one substituent selected from the group consisting of a halogen, an amino and a hydroxy, and are uninterrupted or interrupted by one or more —O—, —S—, —NH— or —N($C_1$-$C_4$alkyl)-; and m is an integer from 1 to 4.

2. The composition of claim 1, wherein the chromophore of the formula (II) is of formula

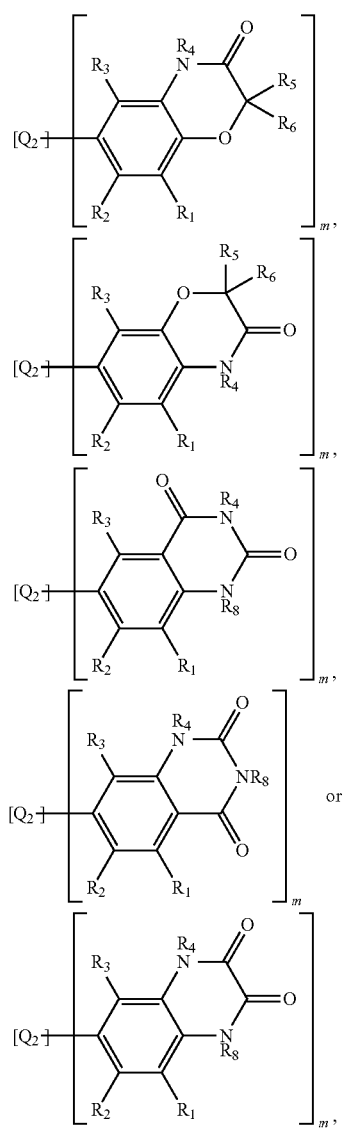

wherein $Q_2$ is an m-valent residue of carbon black or of the chromophore $Q_1$;

$R_1$, $R_2$, $R_3$, $R_4$ and $R_8$ are all H;

each $R_5$ is, independently from any other $R_5$, H, halogen, OH, $NH_2$, $NO_2$, $R_7$, $OR_7$, $SR_7$, $NR_6R_7$, $COR_7$, $CO_2R_7$, $CONR_6R_7$ or $SO_2R_7$;

$R_6$ is H, a direct bond to a geminal $R_5$ or $R_7$ thus forming a 3- to 8-membered homo- or heterocyclic ring, or R7 which is independently from any other $R_7$;

each $R_7$ is, independently of any other $R_7$, $C_1$-$C_8$alkyl, $C_3$-$C_8$cycloalkyl, $C_2$-$C_8$alkenyl, $C_2$-$C_8$alkinyl or $C_3$-$C_8$cycloalkenyl which are each unsubstituted or substituted with at least one substituent selected from the group consisting of a halogen, an amino and a hydroxy, and are uninterrupted or interrupted by one or more —O—, —S—, —NH— or —N($C_1$-$C_4$alkyl)-; and m is an integer from 1 to 4.

3. A colour filter, comprising image points (pixels) of at least three colours and optionally a black matrix, wherein a fraction of the image points, the optional black matrix, or both, comprise the pigment composition of claim 1.

4. The pigment composition of claim 1, wherein the composition comprises from 0.8 to 15 moles of the compound comprising the chromophore of formula (II).

5. The pigment composition of claim 1, wherein each $R_4$ is, independently from any other $R_4$, H, methyl, or ethyl.

6. The pigment composition of claim 1, wherein m is an integer 1 or 2.

7. A compound, comprising a chromophore of formula (II),

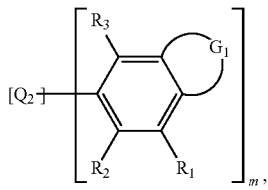

wherein:

m is an integer from 1 to 4;

$Q_2$ is a residue of carbon black or of a chromophore comprising a group of the formula (I),

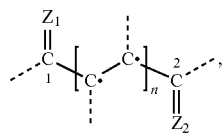

or a cis/trans isomer thereof, wherein $Z_1$ and $Z_2$ are each, independently of the other O or N—, each C· is, independently of all other C·, a carbon atom with an electron in a p orbital, and n is an integer from 1 to 4;

$G_1$ is

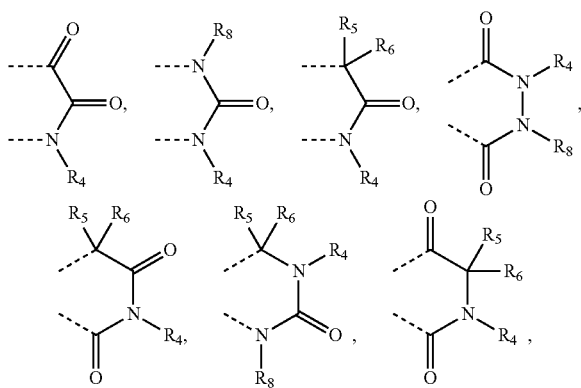

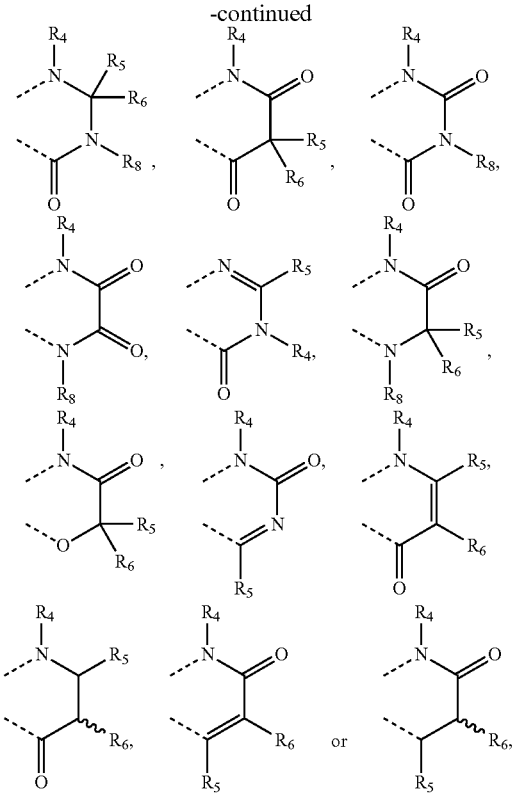

with one extremity of $G_1$ attached to an aromatic C atom in a meta position relative to $Q_2$ and the other extremity of $G_1$ attached to the aromatic C atom in para position to $Q_2$;

$R_8$ has, independently from $R_4$, the same definition as $R_4$;

$R_1$, $R_2$ and $R_3$ are each independently of the others, H, halogen, OH, $NH_2$, $NO_2$, $R_7$, $OR_7$, $SR_7$, $NR_6R_7$, $COR_7$, $CO_2R_7$, $CONR_6R_7$ or $SO_2R_7$;

each $R_4$ is independently from any other $R_4$, H or $R_7$;

each $R_5$ is, independently from any other $R_5$, H, halogen, OH, $NH_2$, $NO_2$, $R_7$, $OR_7$, $SR_7$, $NR_6R_7$, $COR_7$, $CO_2R_7$, $CONR_6R_7$ or $SO_2R_7$;

$R_6$ is H, a direct bond to a geminal $R_5$ or $R_7$ thus forming a 3- to 8-membered homo- or heterocyclic ring, or $R_7$, which is independently from any other $R_7$; and each $R_7$ is, independently of any other $R_7$, $C_1$-$C_8$alkyl, $C_3$-$C_8$cycloalkyl, $C_2$-$C_8$alkenyl, $C_2$-$C_8$alkinyl or $C_3$-$C_3$cycloalkenyl which are each unsubstituted or substituted with at least one substituent selected from the group consisting of a halogen, an amino and a hydroxy, and are uninterrupted or interrupted by one or more —O—, —S—, —NH— or —N($C_1$-$C_4$alkyl).

8. A rheology modifier, comprising the compound of claim 7.

9. A process for preparing the compound of claim 7, the process comprising treating a suspension of carbon black, or of an organic pigment comprising a chromophore $Q_1$, with a diazonium salt, or with an aromatic amine and a diazolating agent, in a liquid medium, wherein:

the chromophore $Q_1$ comprises a group of formula (I),

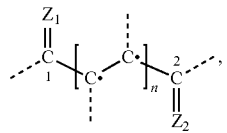

or a cis/trans isomer thereof, wherein $Z_1$ and $Z_2$ are each independently of the other, O or N—, each C· is independently of all ethers other C·, a carbon atom with an electron in a p orbital, and n is an integer from 1 to 4;

the diazonium salt is a salt of formula (III),

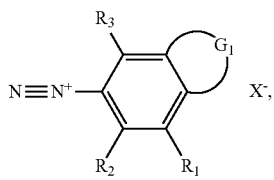

and the aromatic amine is an amine of formula (IV),

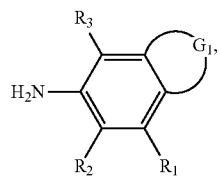

wherein $X^-$ is an inorganic anion; $G_1$ is

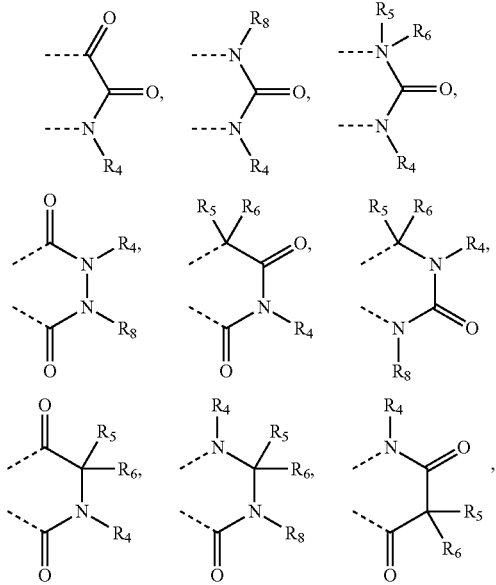

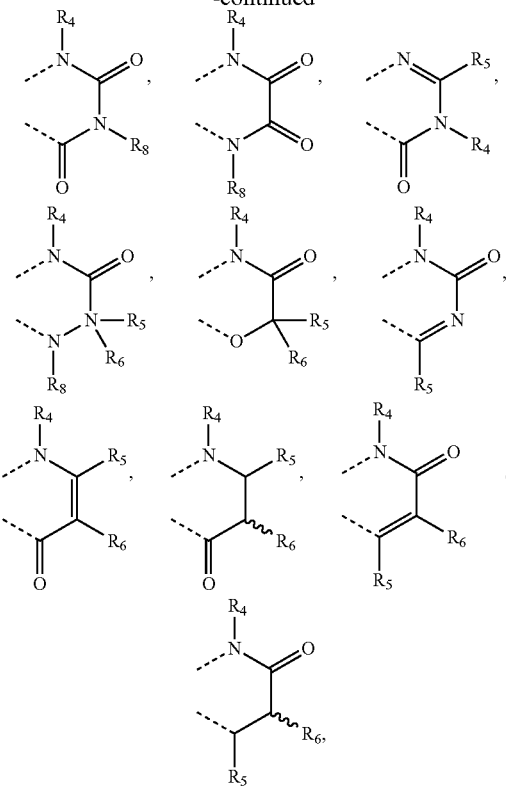

$R_8$ has, independently from $R_4$, the same definition as $R_4$;

$R_1$, $R_2$ and $R_3$ are each independently of the others, H, halogen, OH, $NH_2$, $NO_2$, $R_7$, $OR_7$, $SR_7$, $NR_6R_7$, $COR_7$, $CO_2R_7$, $CONR_6R_7$ or $SO_2R_7$;

each $R_4$ is independently from any other $R_4$, H or $R_7$;

each $R_5$ is, independently from any other $R_5$, H, halogen, OH, $NH_2$, $NO_2$, $R_7$, $OR_7$, $SR_7$, $NR_6R_7$, $COR_7$, $CO_2R_7$, $CONR_6R_7$ or $SO_2R_7$;

$R_6$ is H, a direct bond to a geminal $R_5$ or $R_7$ thus forming a 3- to 8-membered homo- or heterocyclic ring, or R7, which is independently from any other $R_7$; and each $R_7$ is, independently of any other $R_7$, $C_1$-$C_8$alkyl, $C_3$-$C_8$cycloalkyl, $C_2$-$C_8$alkenyl, $C_2$-$C_8$alkinyl or $C_3$-$C_3$cycloalkenyl which are each unsubstituted or substituted with at least one substituent selected from the group consisting of a halogen, an amino and a hydroxy, and are uninterrupted or interrupted by one or more —O—, —S—, —NH— or —N($C_1$-$C_4$alkyl).

10. The compound of claim 7, wherein m is an integer 1 or 2.

11. The compound of claim 7, wherein each $R_4$ is, independently from any other $R_4$, H, methyl or ethyl.

12. A coating composition, comprising
(a) from 0 to 50% by weight of a volatile part,
(b) from 10 to 50% by weight of a non-volatile, essentially colourless part, and
(c) from 5 to 85% by weight of (c1) a colourant part comprising carbon black, (c2) an organic pigment comprising a chromophore $Q_1$ comprising a group of formula (I),

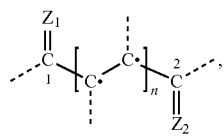

or a cis/trans isomer thereof, wherein $Z_1$ and $Z_2$ are each, independently of the other, O or N—, each C· is, independently of all other C·, a carbon atom with an electron in a p orbital, and n is an integer from 1 to 4, or (c3) both the colourant part (c1) and the organic pigment (c2), all above weight percentages are based on a total weight of the curing coating composition which is always 100%, and (d) from 0.5 to 30 moles, based on $3.5 \cdot 10^4$ g of the carbon black or 100 moles of the organic pigment, of a compound comprising a chromophore of formula (II),

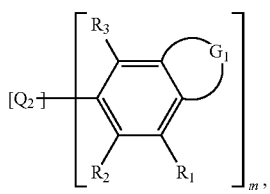

wherein:

$Q_2$ is an m-valent residue of carbon black or of the chromophore $Q_1$;

$G_1$ is

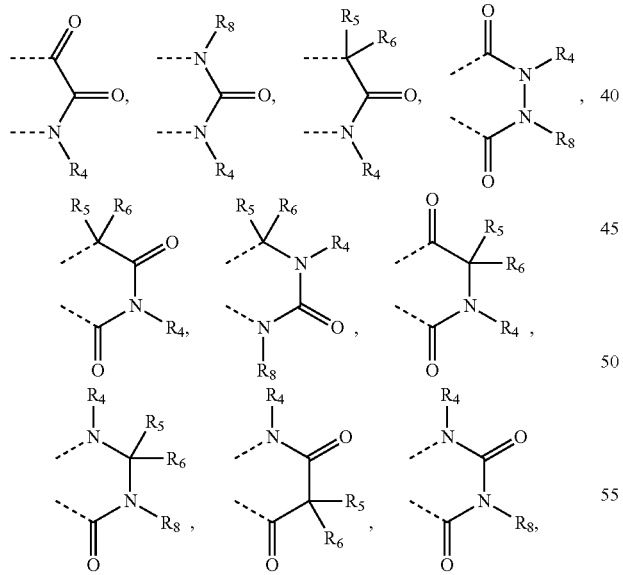

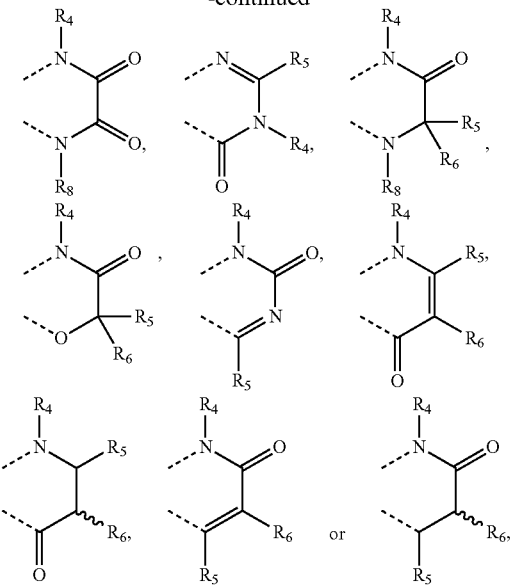

with one extremity of $G_1$ attached to an aromatic C atom in a meta position relative to $Q_2$ and another extremity of $G_1$ attached to an aromatic C atom in a para position relative to $Q_2$;

$R_8$, independently from $R_4$, has the same definition as $R_4$;

$R_1$, $R_2$ and $R_3$ are each independently of the others H, halogen, OH, $NH_2$, $NO_2$, $R_7$, $OR_7$, $SR_7$, $NR_6R_7$, $COR_7$, $CO_2R_7$, $CONR_6R_7$ or $SO_2R_7$;

each $R_4$ is independently from any other $R_4$, H or $R_7$;

each $R_5$ is, independently from any other $R_5$, H, halogen, OH, $NH_2$, $NO_2$, $R_7$, $OR_7$, $SR_7$, $NR_6R_7$, $COR_7$, $CO_2R_7$, $CONR_6R_7$ or $SO_2R_7$;

$R_6$ is H, a direct bond to a geminal $R_5$ or $R_7$ thus forming a 3- to 8-membered homo- or heterocyclic ring, or $R_7$, which is independently from any other $R_7$;

each $R_7$ is, independently of any other $R_7$, $C_1$-$C_8$alkyl, $C_3$-$C_8$cycloalkyl, $C_2$-$C_8$alkenyl, $C_2$-$C_8$alkinyl or $C_3$-$C_8$cycloalkenyl which are each unsubstituted or substituted with at least one substituent selected from the group consisting of a halogen, an amino and a hydroxy, and are uninterrupted or interrupted by one or more —O—, —S—, —NH— or —N($C_1$-$C_4$alkyl)-; and m is an integer from 1 to 4.

13. The coating composition of claim 12, wherein the chromophore $Q_1$ is $[Q_2\text{-}\!\!+\!\!\text{-}H]_m$.

14. A coating, comprising the composition of claim 12.

15. A coating prepared by curing the coating composition of claim 14.

16. A color filter, comprising the composition of claim 12.

17. The coating composition of claim 12, comprising from 5 to 30% by weight of the volatile part (a).

18. The coating composition of claim 12, comprising from 0.8 to 15 moles of the compound (d) comprising the chromophore of formula (II).

* * * * *